(12) United States Patent
Tada

(10) Patent No.: US 6,641,496 B2
(45) Date of Patent: Nov. 4, 2003

(54) BLADE TENSIONER

(75) Inventor: Naosumi Tada, Nabari (JP)

(73) Assignee: BorgWarner Inc., Auburn Hills, MI (US)

( * ) Notice: Subject to any disclaimer, the term of this patent is extended or adjusted under 35 U.S.C. 154(b) by 30 days.

(21) Appl. No.: 10/022,641

(22) Filed: Dec. 18, 2001

(65) Prior Publication Data

US 2002/0119848 A1 Aug. 29, 2002

(30) Foreign Application Priority Data

Dec. 27, 2000 (JP) .................................. 2000-397946

(51) Int. Cl.[7] .................................................. F16H 7/08
(52) U.S. Cl. ........................................ 474/111; 474/101
(58) Field of Search ................................ 474/101, 111; 207/164, 165, 36.1, 47

(56) References Cited

U.S. PATENT DOCUMENTS

| | | | | | |
|---|---|---|---|---|---|
| 1,036,247 A | * | 8/1912 | Huston | ......................... | 267/45 |
| 1,127,511 A | * | 2/1915 | Potter | ........................... | 267/49 |
| 1,265,623 A | * | 5/1918 | Currey | ......................... | 267/47 |
| 1,743,049 A | * | 1/1930 | Smith | ........................... | 267/47 |
| 1,745,269 A | * | 1/1930 | Pilz | .............................. | 267/49 |
| 5,462,493 A | * | 10/1995 | Simpson | ..................... | 474/111 |
| 5,711,732 A | * | 1/1998 | Ferenc et al. | ................ | 474/111 |
| 5,984,815 A | * | 11/1999 | Baddaria | ..................... | 474/111 |
| 6,431,133 B2 | * | 8/2002 | Brandl et al. | ............ | 123/90.31 |
| 6,440,020 B1 | * | 8/2002 | Tada | ........................... | 474/111 |
| 6,447,416 B1 | * | 9/2002 | Jacques et al. | ............. | 474/111 |
| 2002/0072442 A1 | * | 6/2002 | Tada | .......................... | 474/101 |

FOREIGN PATENT DOCUMENTS

| | | |
|---|---|---|
| JP | 2000-230611 | 8/2000 |
| JP | 2000-234656 | 8/2000 |

* cited by examiner

*Primary Examiner*—David Fenstermacher
(74) *Attorney, Agent, or Firm*—Brown & Michaels, PC; Greg Dziegielewski

(57) ABSTRACT

A blade tensioner includes a blade shoe having a chain slide face, a plurality of blade springs for applying spring force to the blade shoe, and a spacer member interposed between the adjacent blade springs. Each of the blade springs is in the shape of a leaf spring. The blade springs are positioned and layered on the opposite side of the blade shoe from the chain slide face. The spacer member preferably contacts the corresponding blade spring at two contact points apart from each other at a uniform distance. In the blade tensioner of this invention, the blade spring contacts the spacer member at a constant span, which causes the damping coefficient of the whole blade spring to be constant and also causes the damping performance of the blade tensioner to be stable.

9 Claims, 6 Drawing Sheets

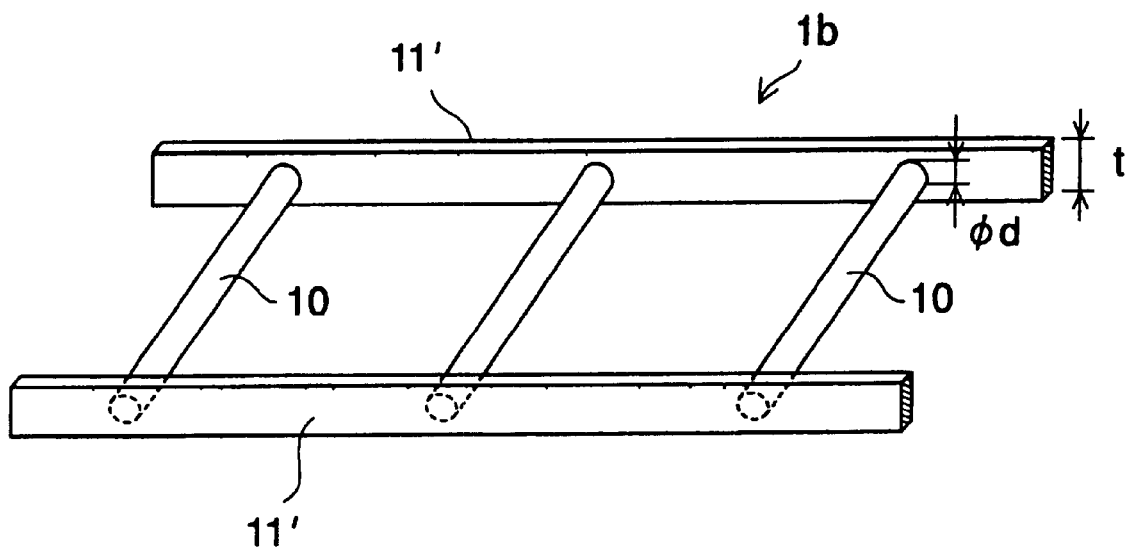
Figure 7
Figure 8
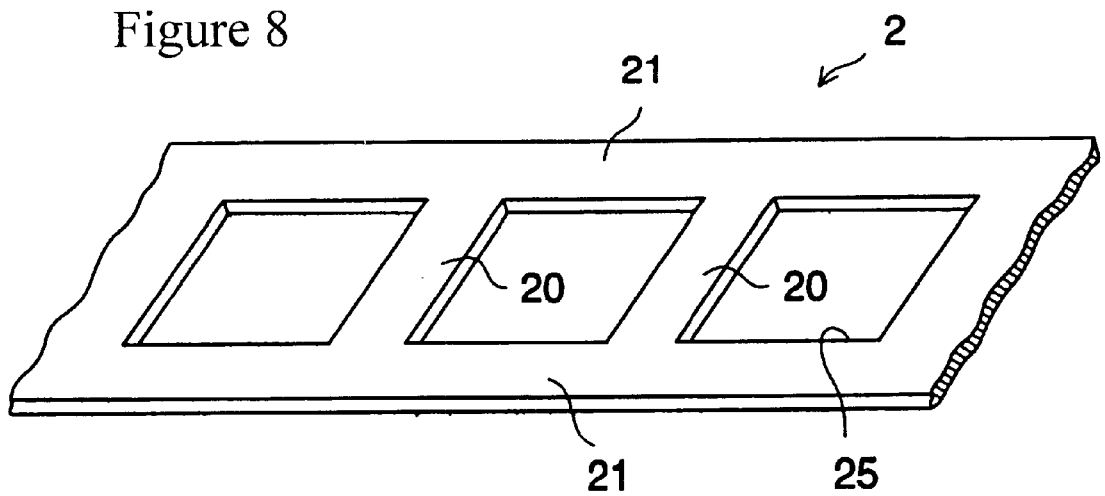

BLADE TENSIONER

BACKGROUND OF THE INVENTION

1. Field of the Invention

The invention pertains to the field of blade tensioners. More particularly, the invention pertains to a blade tensioner equipped with a blade shoe having a chain sliding face and numerous leaf spring-shaped blade springs for applying a spring force to this blade shoe.

2. Description of Related Art

Blade tensioners have been used in the past to apply tension to chains. An example of a blade tensioner is shown in FIG. 10. The conventional blade tensioner (100) includes a blade shoe (101) made of resin having a curved chain sliding face (101a) and numerous blade springs (102) preferably made of metallic material. The blade springs (102) are arranged in layers on the opposite side of blade shoe (101) from chain sliding face (101a), and provide spring force to blade shoe (101). The ends of each spring-shaped blade spring (102) are inserted in the indented portions (111) and (113) which are formed in the distal portion (110) and proximal portion (112) of blade shoe (101), respectively.

A bracket (120) is provided for mounting blade tensioner (100) in an engine. Holes (121) and (122) are formed in bracket (120), and mounting bolts are inserted into these holes (121) and (122). Sliding face (125) contacts the distal portion of blade shoe (101) and permits sliding. Slide face (125) is formed on the distal portion of bracket (120). One end of pin (130), which supports the proximal portion (112) of blade shoe (101) so that it may move in either direction, is secured in the center of bracket (120).

When the chain is operating, the chain continues to slide and run on sliding face (101a) of blade shoe (101). The pushing load accompanying the change in the shape of blade shoe (101) and blade springs (102) is applied to the chain so that a constant tension is maintained in the chain. Likewise, the oscillation due to the clattering of the chain and variations in tension are transmitted to the respective blade springs (102) in blade shoe (101) by virtue of blade shoe (101). Each blade spring (102) repeatedly deforms elastically and returns, and the oscillation of the chain is dampened by adjacent blade springs (102) sliding together.

Referring also to FIG. 11, there is ample variation in the curvature and length in blade springs as products. As a result, when numerous blade springs are layered and installed in blade shoes, variation occurs in the contact position of each blade spring (contact point) C, C', state of contact and gap T. Consequently, variation in the damping coefficient of the blade springs overall occurs and the problem of inconsistency of damping performance of the blade tensioner can arise.

Therefore, there is a need in the art for a blade tensioner that stabilizes damping performance.

SUMMARY OF THE INVENTION

This invention provides a blade tensioner comprised of a blade shoe having a chain slide face, a plurality of blade springs for applying spring force to the blade shoe, and a spacer member interposed between the adjacent blade springs. Each of the blade springs is preferably in the shape of a leaf spring. The blade springs are positioned and layered on the opposite side of the blade shoe from the chain slide face. The spacer member preferably contacts the corresponding blade spring at two contact points apart from each other at a uniform distance. In the blade tensioner of this invention, the blade spring contacts the spacer member at a constant span, which causes the damping coefficient of the whole blade spring to be constant and also allows the damping performance of the blade tensioner to be stable.

BRIEF DESCRIPTION OF THE DRAWINGS

FIG. 7 shows a partial oblique view of the spacer member having the slip-off preventing feature, showing a variant of the spacer member of FIG. 3.

FIG. 8 shows a partial oblique view of a spacer member for an alternative embodiment of the invention.

DETAILED DESCRIPTION OF THE INVENTION

Figure 1:
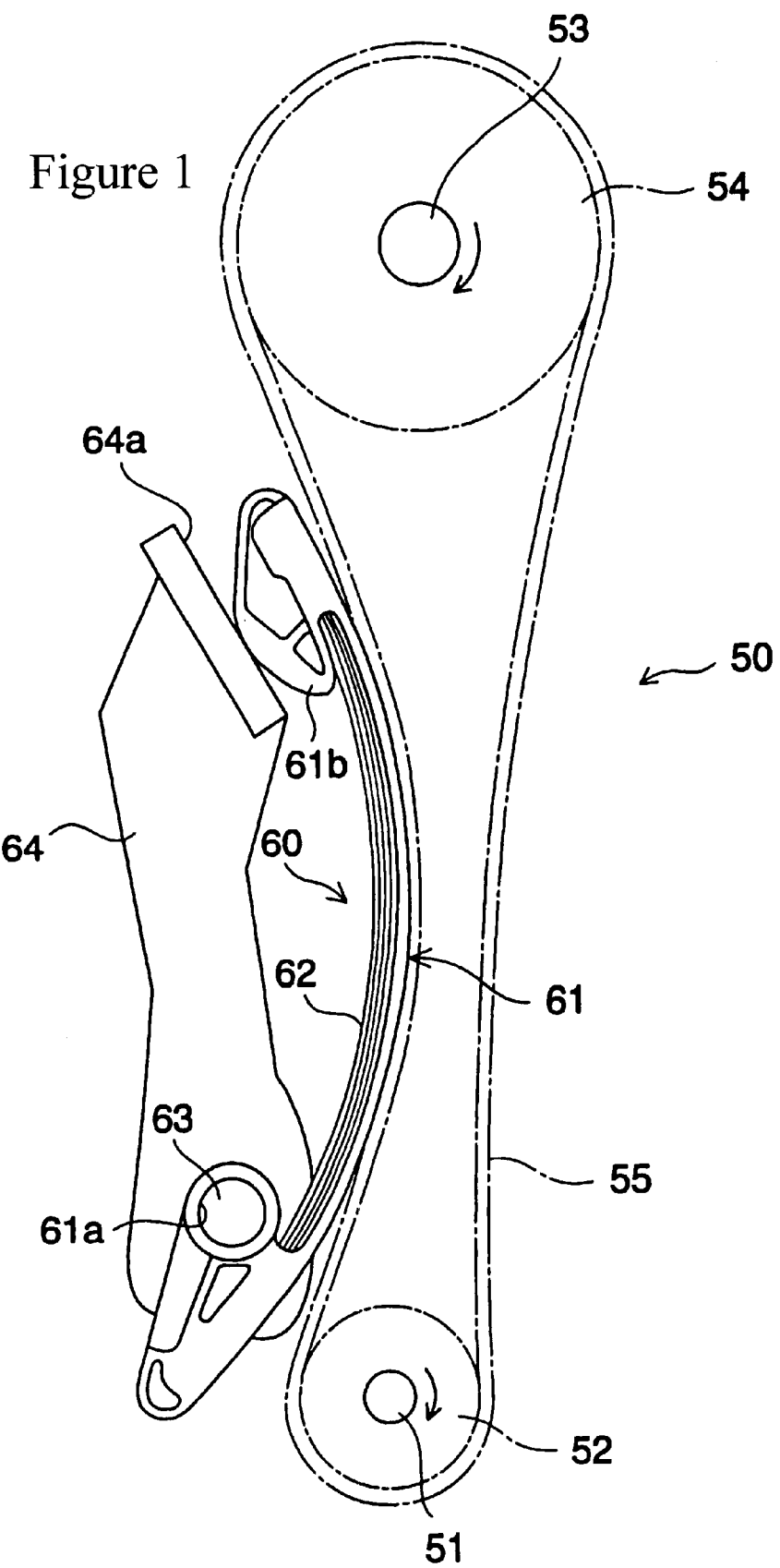
FIG. 1 shows an overall block diagram of a camshaft timing system utilizing the blade tensioner of the present invention.

A blade tensioner for applying tension to a chain includes a blade shoe having a chain sliding face and numerous blade springs. Each blade spring is preferably in the shape of a leaf spring layered and disposed on the opposite side of the blade shoe from the chain sliding face. A spacer member is interposed between adjacent blade springs. The spacer member contacts corresponding blade springs at at least two points separated by a uniform distance.

When a chain is operating, the chain slides on the chain sliding face of a blade shoe and uniform tension is applied to the chain by the elastic rebound force due to the blade shoe and deformation of the blade spring acting as a load on the chain. Moreover, under these circumstances, spacer members are disposed between adjacent blade springs and these spacer members contact the blade springs at at least two points separated at uniform intervals. That is to say, each blade spring contacts a spacer member at a uniform span contact point without contacting the other at unspecified positions. This eliminates the variation in the damping rate of the overall blade spring and stabilizes the damping performance of the blade tensioner.

A nearly equal space is preferably formed between adjacent blade springs. Irregular contact between blade springs which have deformed when there is a pushing load from the chain are avoided. Therefore, variation of the blade springs overall damping coefficient due to changes in the state of contact is prevented.

The spacer members include numerous spacers disposed spaced apart in the spring longitudinal direction and a pair of connectors which extend in the spring longitudinal direction and link the spacers. Under these circumstances, a nearly uniform gap is formed between blade springs following the longitudinal direction of blade springs by respective spacers functioning as spacers. The curvature of each blade spring is made nearly uniform with the result that the damping rate of the blade spring overall is made uniform and the damping performance of a blade tensioner is stabilized. Moreover, under these circumstances, because a nearly uniform space is formed between each adjacent blade spring, a blade spring which has changed shape when a pushing load is applied from a chain contacts the spacer member it contacts uniformly and the overall damping rate of the blade springs is stabilized. Likewise, under these circumstances the damping power of a blade tensioner is improved because the number of contact surfaces with the spacer members increase. In a preferred embodiment, the spacer members have a circular, oval or rectangular cross-section.

The ends of the spacers preferably have a slip-off preventing portion which prevents the spacer member from slipping off of the blade spring. Alternatively, the connectors have a slip-off preventive feature to prevent the spacer member from slipping off of the blade spring. In one embodiment, the spacer member is formed by molding or press punching band steel. A friction material is preferably on the face of the spacer member which contacts the blade spring. This increases the damping power due to the spacer member and improves the damping performance of the blade tensioner.

The blade tensioner is preferably combined with a camshaft drive chain of an overhead camshaft engine. The blade tensioner design of the present invention reduces the overall cost of a camshaft timing system because it can be manufactured at a lower cost than an oil pressure tensioner.

The following description explains a preferred embodiment of the invention based on the accompanying drawings.

FIG. 1 shows a camshaft timing system utilizing the blade tensioner of the present invention. As this drawing shows, the camshaft timing system (50) is equipped with crank sprocket (52) secured to crankshaft (51). Cam sprocket (54) is secured to camshaft (53). Timing chain (55) has been wrapped around these sprockets (52) and (54).

Blade tensioner (60) is disposed on the slack side of timing chain (55). The blade tensioner (60) is configured chiefly with a blade shoe (61) made of resin curving in an arc, numerous blade springs (62) for applying spring force to blade shoe (61), and bracket (64) which supports blade shoe (61).

Blade shoe (61) is supported so that it may rotate in either direction by a bolt or pin (63) which passes through hole (61a) formed on its proximal end. Pin (63) is secured in bracket (64). Likewise, the distal end (61b) of blade shoe (61) contacts the supporting face (64a) of the end of bracket (64) so that it can slide on this support face (64a).

While a single overhead camshaft (SOHC) type engine is shown in FIG. 1, the blade tensioner of this invention may be applied in the same way to a double overhead camshaft type engine (DOHC). Likewise, it may be applied in the same way to an auxiliary drive chain for driving auxiliary devices such as engine oil pumps which have been used in the past as well as for timing chains like these.

Figure 10:
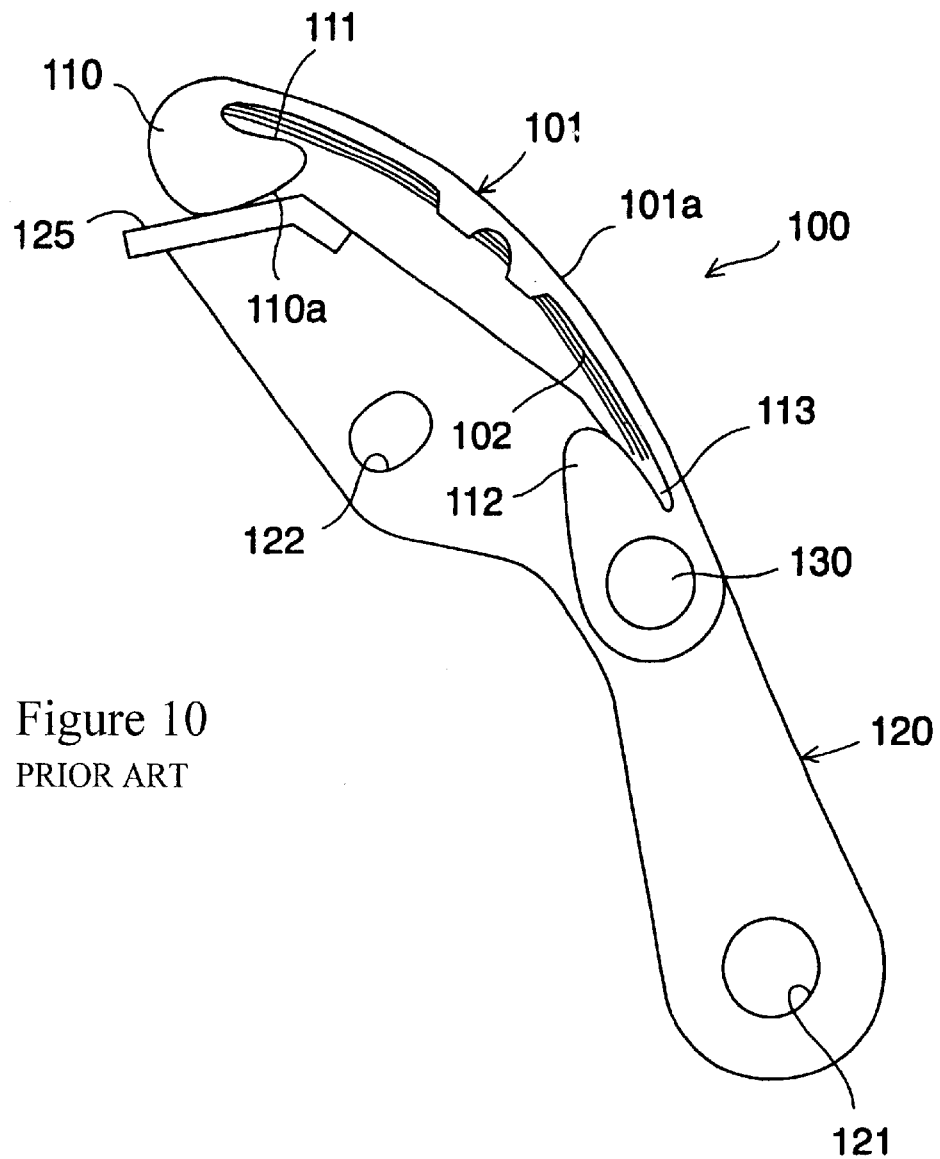
FIG. 10 shows a side view of a conventional blade tensioner.
Figure 11:
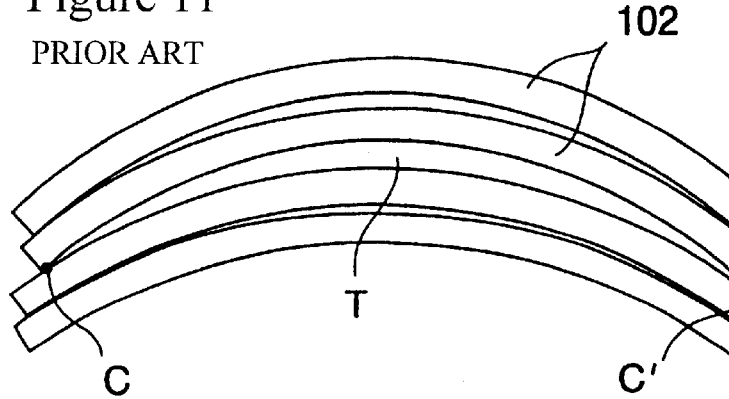
FIG. 11 shows a drawing explaining the problems of blade spring assemblies in prior art blade tensioners.

Furthermore, the blade tensioner of this invention is not restricted to engines like that shown in FIG. 1, it may be applied to other blade tensioners besides that shown in FIG. 10 as long as numerous blade springs are disposed in layers on the opposite side of the blade shoe from the chain sliding face.

Figure 2:
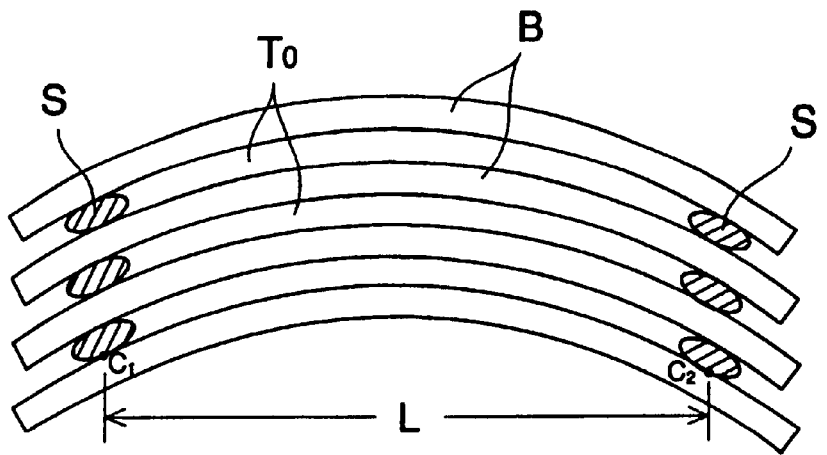
FIG. 2 shows a side view of the blade spring assembly of the blade tensioner of the present invention.

FIG. 2 is an enlarged side view of the blade springs. A spacer member S separating a set span L is inserted between each adjacent blade springs B and B. By virtue of these spacer members S, each blade spring B contacts a spacer member S at contacts $C_1$ and $C_2$ separated at a uniform distance without contacting each other at an irregular contact position. This eliminates the variation of the damping coefficient of the entire blade spring and stabilizes the damping performance of the blade tensioner.

Likewise, in this case it becomes possible to form a roughly equal gap $T_0$ for each of the gaps formed between adjacent blade springs B and B. An irregular contact state between blade springs which have deformed is avoided when the load from the chain is exerted and thereby variation in the damping coefficient of the blade spring overall due to variation in contact state is prevented.

Figure 3:
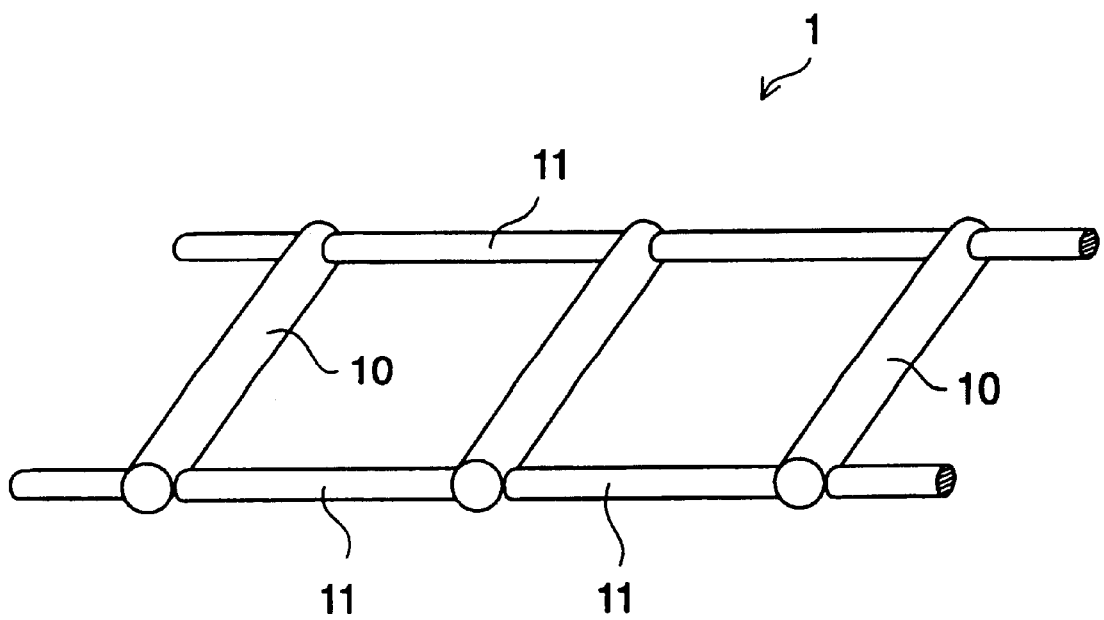
FIG. 3 shows a partial oblique view of a spacer member in an embodiment of the present invention.

FIG. 3 is a partial oblique view of the spacer member of this embodiment of the invention. The spacer member (1) is configured from numerous spacers (10) which extend in the latitudinal direction (perpendicular to FIG. 2 paper surface) of the respective blade springs B and are placed and separated from each other in the longitudinal direction of blade springs B, and a pair of connector members (11) which link the respective spacers (10) and extend in the longitudinal direction of blade springs B.

Because each spacer (10) functions as a spacer between blade spring B and B, a nearly uniform space is formed following the spring longitudinal direction between blade spring B and B by virtue of these spacers (10). The curvature of each blade spring B is made nearly uniform and as a result the overall damping coefficient of the blade springs is also made uniform. Thus, the damping performance of the blade tensioner is stabilized.

Moreover, under these circumstances, because a nearly equal space $T_0$ is formed between respective adjacent blade springs B and B, blade springs which have deformed when there is a pushing load from the chain uniformly contact the spacer members they contact, and the damping coefficient of the blade springs overall is stabilized. Likewise, under these circumstances the damping power of the blade tensioner is improved because the number of surfaces contacting the spacer members of the blade springs increases.

In addition, due to these spacer members S, each blade spring B contacts spacer (10) at three or more uniformly separated contact points. Under these circumstances as well, each blade spring B contacts spacer members with a uniform span with no differences. The variation in the overall damping coefficient of the blade springs is thereby reduced and the damping performance of a blade tensioner is stabilized.

Spacer members are, for example, formed with synthetic resin molding materials or formed with rubber molding materials. Likewise, the horizontal cross section of spacer members (10) is not restricted to a circular configuration; it may alternatively be oval or rectangular in shape.

Figure 4:
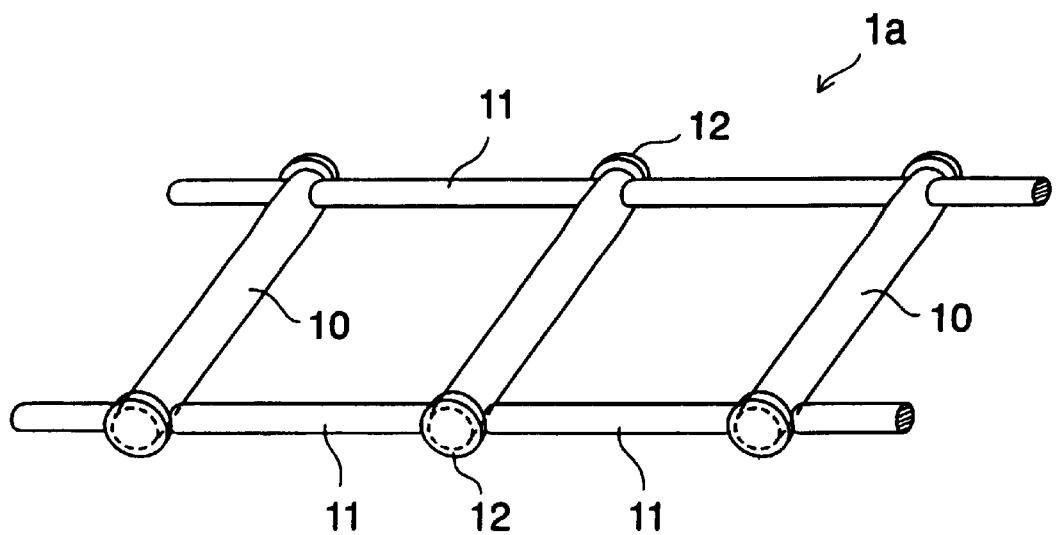
FIG. 4 shows a partial oblique view of a spacer member provided with a slip-off preventive portion, showing a variant of the spacer member of FIG. 3.

FIG. 4 shows the spacer members shown in FIG. 3 augmented with a slip-off preventive feature. Both ends of the spacers (10) in the spacer member (1a) have a large diameter slip-off preventive portion (12) with an external diameter larger than that of each spacer (10). These slip-off preventive portions (12) prevent spacer members from slipping off of the blade springs.

Figure 5:
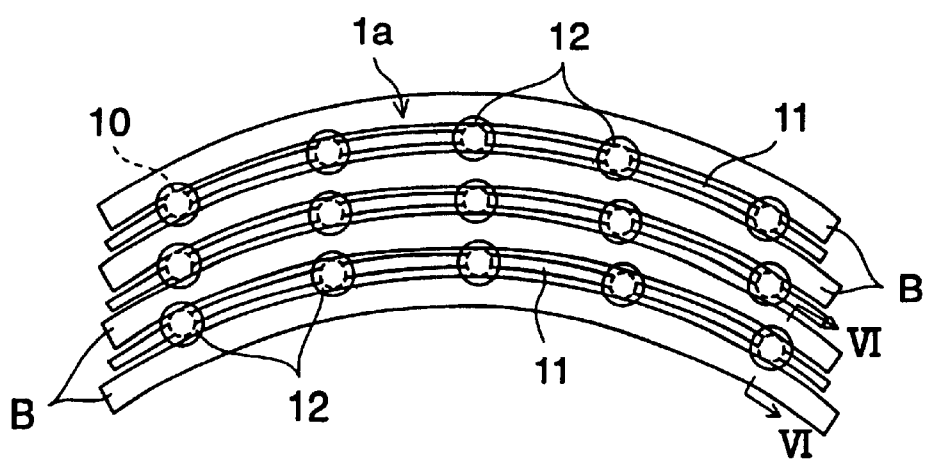
FIG. 5 shows a side view of the blade spring assembly containing the spacer member.
Figure 6:
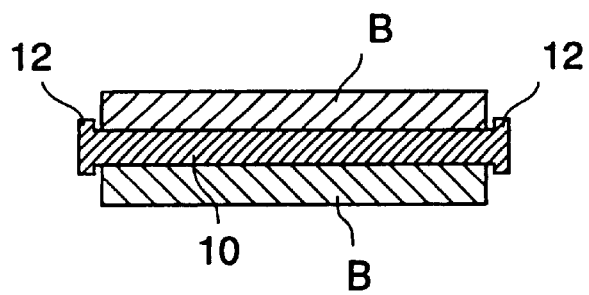
FIG. 6 shows a cross-sectional view of line VI—VI of FIG. 5.

FIG. 5 shows spacer member (1a) installed between blade springs B and B. Due to the respective spacers (10) of spacer member (1a), a nearly uniform space is formed following the spring longitudinal direction between respective blade springs B and B. Likewise, as is clearly shown in FIG. 6, slip-off preventive portion (12) is disposed on both ends of blade spring B, and by virtue of this spacer member (1a) is prevented from slipping off of blade spring B after the assembly of the blade tensioner.

FIG. 7 also shows the spacer members shown in FIG. 3 augmented with a slip-off preventive feature. In the spacer member (1b), a pair of connectors (11') linking each spacer (10) has a slip-off preventive feature. That is to say, in this case the relationship d<t obtains under these circumstances when the external diameter of a circular cross-section spacer (10) is d and the width of thin plate connector (11') is t. Under these circumstances, when spacer member (1b) is mounted between blade springs, connector portion (11') is disposed on both ends of blade spring B. By virtue of this, spacer member (1b) is prevented from slipping off of blade spring B after the assembly of the blade tensioner.

FIG. 8 is a partial oblique view of a spacer member in another embodiment of this invention. The spacer member (2) is configured from numerous spacers (20) formed by punching out rectangular holes (25) at a uniform spacing in a steel band and a pair of connectors (21), linking the respective spacers (20) extending in a longitudinal direction. Under these circumstances, these spacers (20) form a nearly uniform space following the spring longitudinal direction between adjacent blade springs.

Figure 9:
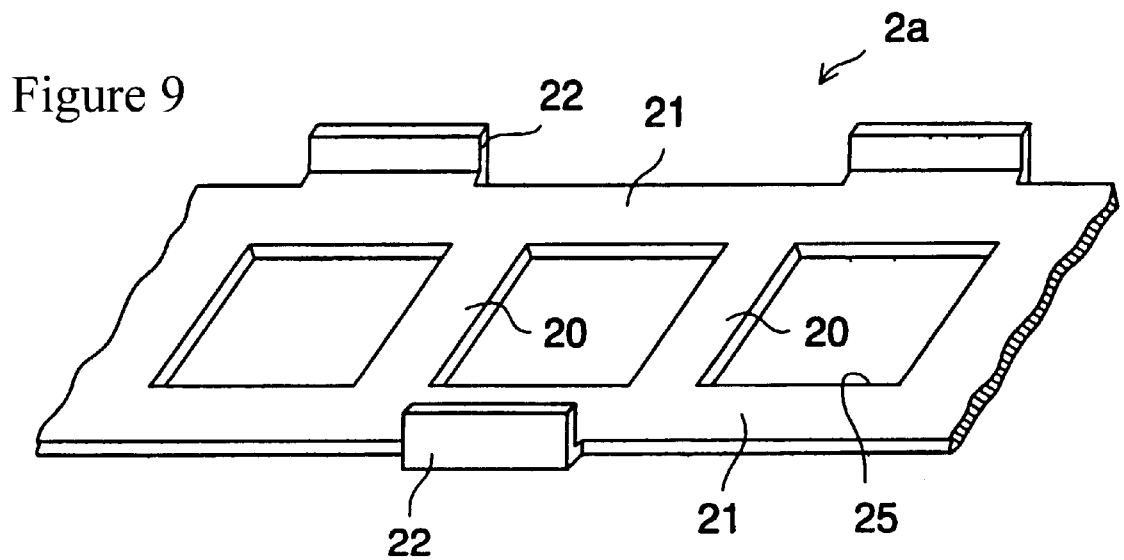
FIG. 9 shows a partial oblique view of a spacer member having a slip-off preventive feature, showing a variant of the spacer member of FIG. 8.

FIG. 9 shows the spacer member shown in FIG. 8 augmented with a slip-off preventive feature. The spacer member (2a) has numerous erect wall portions (22), which go upward in a direction intersecting the direction spacers (20), disposed in the outer rim portion of each connector (21). When mounted to blade springs, spacer member (2a) is prevented from slipping off of blade springs after the blade tensioner is assembled by placing the erect wall portions (22) on both ends of blade spring B.

In each of the previously mentioned embodiments friction materials may be applied or installed by mold forming on blade springs of respective spacers (10) and (20) of spacer members. This increases sliding resistance with respect to spacer members when blade springs deform. Damping power due to blade springs is increased, resulting in an improvement in the damping performance of the blade tensioner.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A blade tensioner for applying tension to a chain comprising:

a blade shoe having a chain sliding face;

a plurality of blade springs for applying spring force to the blade shoe, each of the blade springs being in the shape of a leaf spring, the blade springs being positioned and stacked on an opposite side of the blade shoe from the chain sliding face; and at least one spacer member interposed between each adjacent blade spring, the spacer member contacting the corresponding blade spring at at least two contact points separated from each other by a uniform distance.

2. The blade tensioner of claim 1, wherein the adjacent blade springs have a generally equal space formed therebetween.

3. The blade tensioner of claim 1, wherein the spacer member comprises:

a plurality of spacers placed apart from each other along a length of the blade spring; and a pair of connectors connecting each spacer and extending along the length of the blade spring.

4. The blade tensioner of claim 3, wherein each spacer has a cross-sectional shape selected from the group consisting of:

a rectangular shape;

a circular shape; and an oval shape.

5. The blade tensioner of claim 3, wherein an end of each spacer comprises a slip-off preventive portion, wherein the slip-off preventive portion prevents each spacer member from slipping off of the blade spring.

6. The blade tensioner of claim 3, wherein each connector comprises a slip-off preventive portion, wherein the slip-off preventive portion prevents each spacer member from slipping off the blade spring.

7. The blade tensioner of claim 1, wherein the spacer member is formed from the method selected from the group consisting of forming a band steel and punching a band steel.

8. The blade tensioner of claim 1, wherein the spacer member comprises a friction material on a face in contact with the blade spring.

9. The blade tensioner of claim 1, wherein the blade tensioner further comprises a drive chain for a cam shaft of an overhead cam shaft engine.

* * * * *